United States Patent
Zhou

(10) Patent No.: US 11,092,260 B2
(45) Date of Patent: Aug. 17, 2021

(54) MULTIPLE STAGE ANTI-SURGE VALVES

(71) Applicant: EMERSON PROCESS MANAGEMENT (TIANJIN) VALVES CO., LTD., Tianjin (CN)

(72) Inventor: Qiyong Zhou, Tianjin (CN)

(73) Assignee: Emerson Process Management (Tianjin) Valves CO., LTD, Tianjin (CN)

( * ) Notice: Subject to any disclaimer, the term of this patent is extended or adjusted under 35 U.S.C. 154(b) by 174 days.

(21) Appl. No.: 15/768,452

(22) PCT Filed: Oct. 16, 2015

(86) PCT No.: PCT/CN2015/092088
§ 371 (c)(1),
(2) Date: Apr. 13, 2018

(87) PCT Pub. No.: WO2017/063187
PCT Pub. Date: Apr. 20, 2017

(65) Prior Publication Data
US 2018/0328517 A1    Nov. 15, 2018

(51) Int. Cl.
*F16K 47/08*  (2006.01)
*F16K 3/24*   (2006.01)
*F16K 3/26*   (2006.01)

(52) U.S. Cl.
CPC ........... *F16K 47/08* (2013.01); *F16K 3/243* (2013.01); *F16K 3/267* (2013.01)

(58) Field of Classification Search
CPC .......... F16K 47/04; F16K 47/08; F16K 3/243; F16K 3/267; Y10T 137/86734;
(Continued)

(56) References Cited

U.S. PATENT DOCUMENTS 1,122,928 A * 12/1914 Hodges ............... F16K 3/26
                                                 251/325
3,794,063 A *  2/1974 Carroll ............... F16K 3/26
                                                 137/505.26
(Continued)

FOREIGN PATENT DOCUMENTS

CA         2482181     10/2003
CN       201102967     8/2008
(Continued)

OTHER PUBLICATIONS

International Bureau, "International Preliminary Report on Patentability," issued in connection with International Application No. PCT/CN2015/092088, dated Apr. 26, 2018, 6 pages.
(Continued)

*Primary Examiner* — Michael R Reid
(74) *Attorney, Agent, or Firm* — Hanley, Flight & Zimmerman, LLC

(57) ABSTRACT

Example multiple stage anti-surge valves are disclosed. In some examples, an apparatus includes a cage having a first section adjacent the valve seat with a first fluid flow passage, a second section spaced from the first section along a longitudinal axis of the cage with a second fluid flow passage, and a third section devoid of a fluid flow passage between the first and second sections. The example apparatus includes a plug slidably disposed in the cage, the plug having a third fluid flow passage through a skirt of the plug, the third fluid flow passage to be fluidly coupled to the second fluid flow passage during a stroke of the plug.

21 Claims, 7 Drawing Sheets

(58) Field of Classification Search
CPC ..... Y10T 137/86759; Y10T 137/86799; Y10T 137/86807
USPC .............. 137/625.3, 625.33, 625.38, 625.39
See application file for complete search history.

(56) References Cited

U.S. PATENT DOCUMENTS

| | | | |
|---|---|---|---|
| 3,880,399 A | | 4/1975 | Luthe |
| 7,448,409 B2 * | | 11/2008 | Micheel ................. F16K 3/246 137/625.37 |
| 8,740,179 B2 | | 6/2014 | Griffin, Jr. et al. |
| 2003/0192601 A1 | | 10/2003 | Baumann |
| 2011/0226980 A1 | | 9/2011 | Richardson et al. |
| 2013/0068987 A1 | | 3/2013 | Sun et al. |
| 2016/0327184 A1 | | 11/2016 | Richardson et al. |
| 2017/0009907 A1 * | | 1/2017 | Nitta ......................... F16K 5/04 |

FOREIGN PATENT DOCUMENTS

| | | |
|---|---|---|
| CN | 201110411 | 9/2008 |
| CN | 101292106 | 10/2008 |
| CN | 102449365 | 5/2012 |
| CN | 103727307 | 4/2014 |
| CN | 104048051 | 9/2014 |
| CN | 104048061 | 9/2014 |
| DE | 69914643 | 10/2004 |
| GB | 2506657 | 4/2014 |
| WO | 2017063187 | 4/2017 |

OTHER PUBLICATIONS

China National Intellectual Property Administration. "Second Office Action," issued in connection with application No. 201580085099.2, dated Sep. 19, 2019, (10 pages).

International Searching Authority, "International Search Report and Written Opinion," issued in connection with International Patent Application No. PCT/CN2015/092088, dated Jun. 24, 2016, 12 pages.

The Patent Office of the People's Republic of China, "First Office Action," issued in connection with Chinese Application No. 2015800850992, dated Jan. 21, 2019, 8 pages.

The Patent Office of the People's Republic of China, "Search Report," issued in connection with Chinese Application No. 2015800850992, dated Jan. 21, 2019, 3 pages.

Chinese Patent Office, "Notice of Allowance," issued in connection with Chinese Patent Application No. 2015800850992, dated Apr. 14, 2020, 5 pages.

* cited by examiner

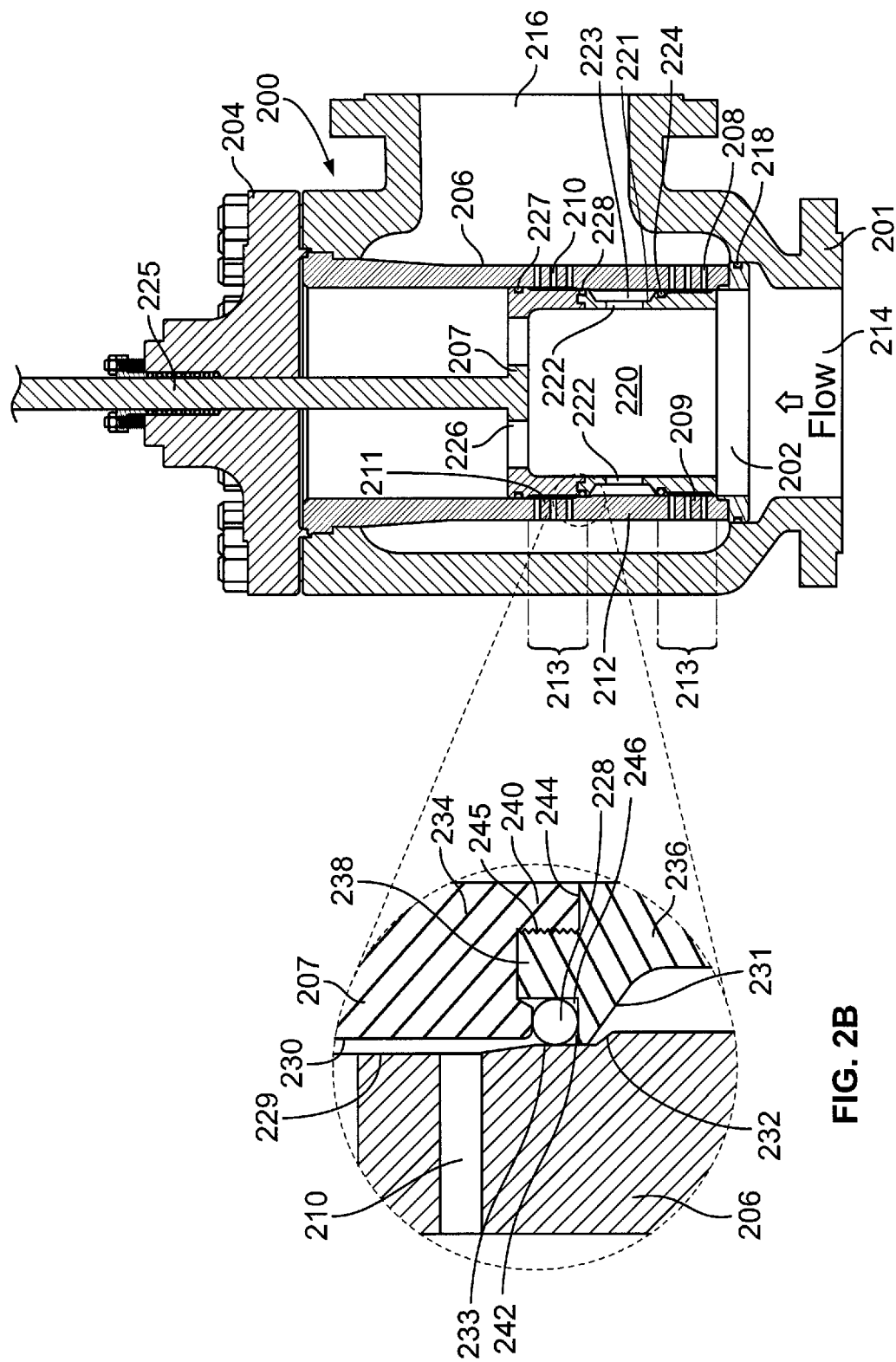

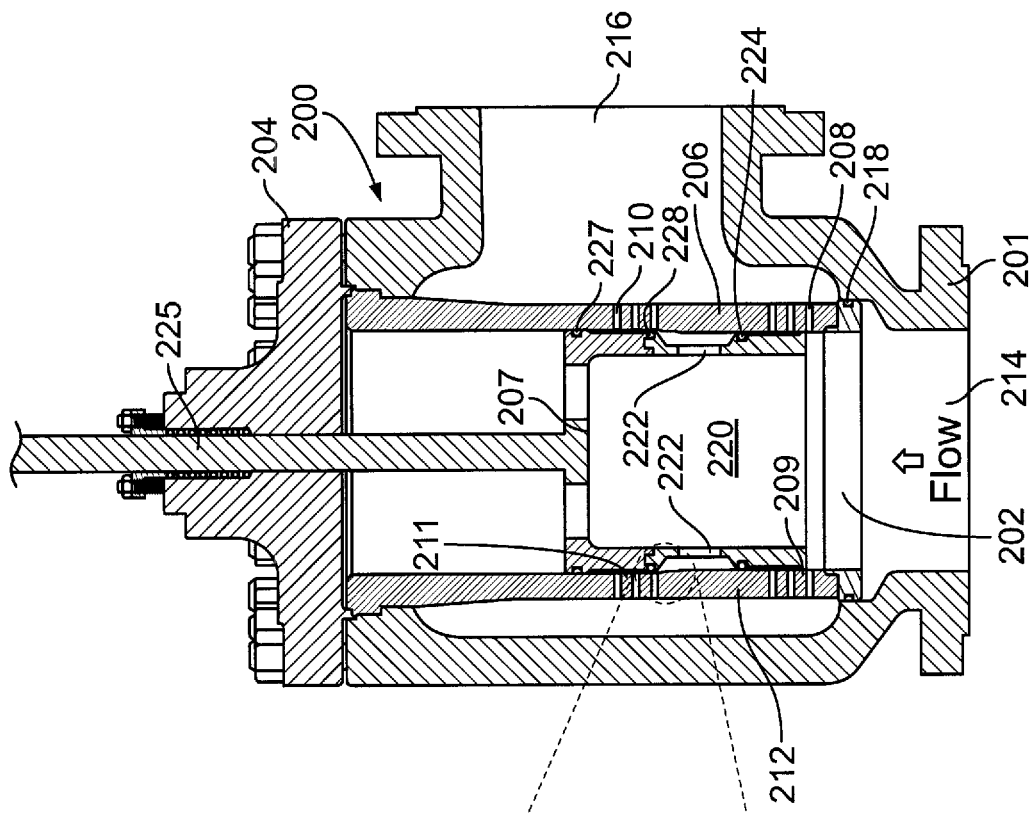
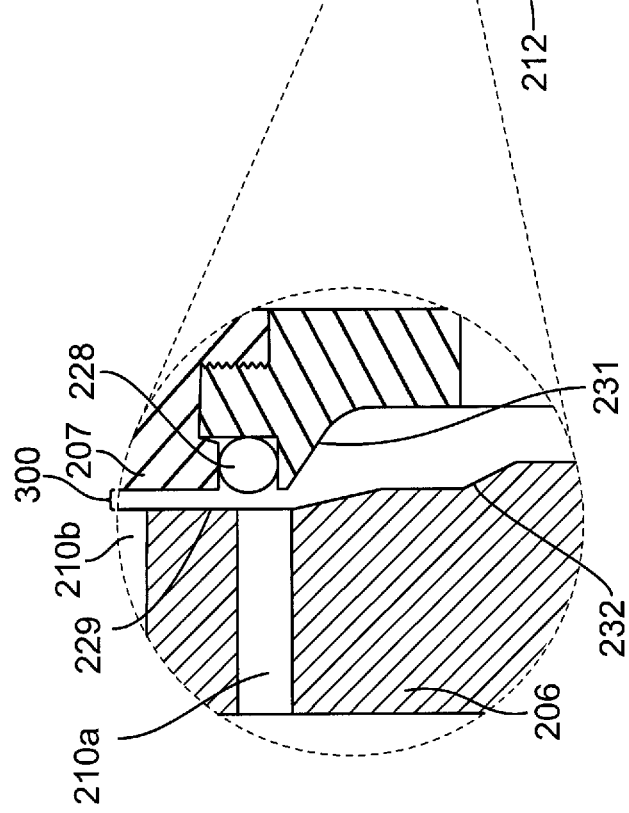
FIG. 3A
FIG. 3B

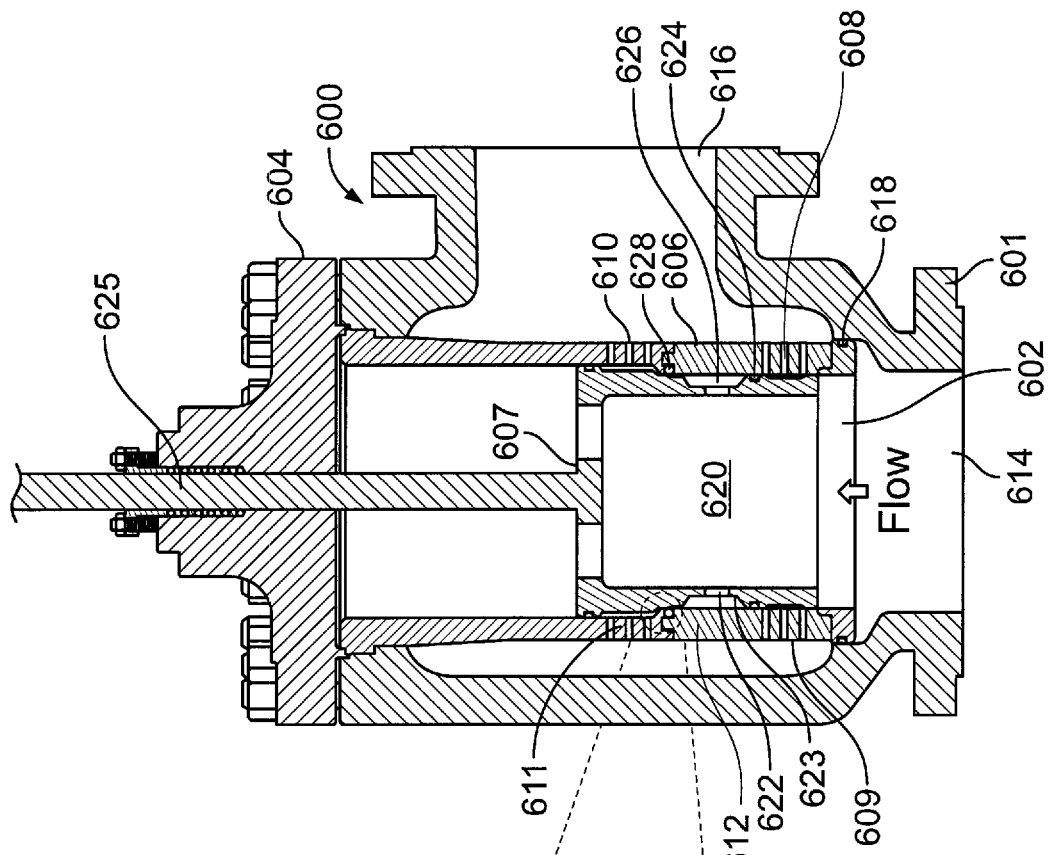
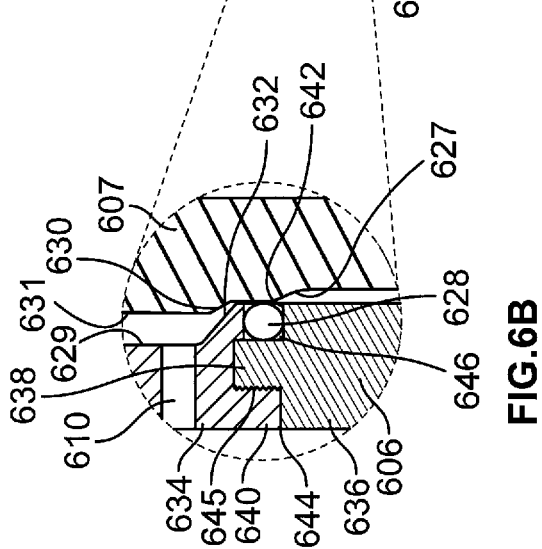
FIG.6A
FIG.6B

MULTIPLE STAGE ANTI-SURGE VALVES

FIELD OF THE DISCLOSURE

This disclosure relates generally to fluid control valves and, more particularly, to multiple stage anti-surge valves.

BACKGROUND

Control valves are often used in process control plants or systems to control the flow of process fluids. In some instances, process conditions produce a surge condition characterized by a fast flow reversal (e.g., in milliseconds), excessive vibration, and/or increases in temperature and/or noise. Additionally, surges can cause a compressor or other device controlling the valve to trip a breaker, blow a fuse, or other electrical/mechanical shut off. Often, anti-surge control valves are used to counteract surges. These valves must move or stroke very quickly to effectively counteract a surge condition. Additionally, these valves must stroke through a long travel to maximize flow capacity.

SUMMARY

In one example, an apparatus comprises a valve cage disposed between a bonnet and a valve seat. The cage includes a first section adjacent the valve seat and having a first fluid flow passage, a second section spaced from the first section along a longitudinal axis of the valve cage and having a second fluid flow passage, and a third section devoid of a fluid flow passage between the first and second sections. The example apparatus further comprises a plug slidably disposed in the valve cage. The plug includes a third fluid flow passage through a skirt of the plug, the third fluid flow passage to be fluidly coupled to the second fluid flow passage during a stroke of the plug.

Another example apparatus comprises a valve seat coupled to a cage. The cage includes a first aperture disposed in a side of the cage within one stroke length from the valve seat. The cage further includes a second aperture disposed in the side of the cage spaced from the first aperture along a longitudinal axis of the cage. The apparatus further comprises a fluid flow control member to be slidably disposed within the cage. The fluid flow control member includes a third aperture disposed within a side of the fluid flow control member.

Another example apparatus comprises means for controlling fluid flow within a valve. The means for controlling fluid flow includes first means for allowing fluid flow therethrough. The example apparatus further comprises means for guiding the means for controlling fluid flow during a stroke of the valve. The means for guiding includes second and third means for allowing fluid flow therethrough, the third means spaced from the second means along a longitudinal axis of the means for guiding.

BRIEF DESCRIPTION OF THE DRAWINGS

FIG. 2A illustrates a cross-sectional view of an example multiple stage anti-surge valve.

FIG. 2B illustrates an enlarged portion of the example multiple stage anti-surge valve of FIG. 2A.

FIG. 3A illustrates a cross-sectional view of the example multiple stage anti-surge valve of FIG. 2A in a partially open condition.

FIG. 3B illustrates an enlarged portion of the example multiple stage anti-surge valve of FIG. 3A.

FIG. 6A illustrates a cross-sectional view of yet another example multiple stage anti-surge valve.

FIG. 6B illustrates an enlarged portion of the example multiple stage anti-surge valve of FIG. 6A.

Figure 1:
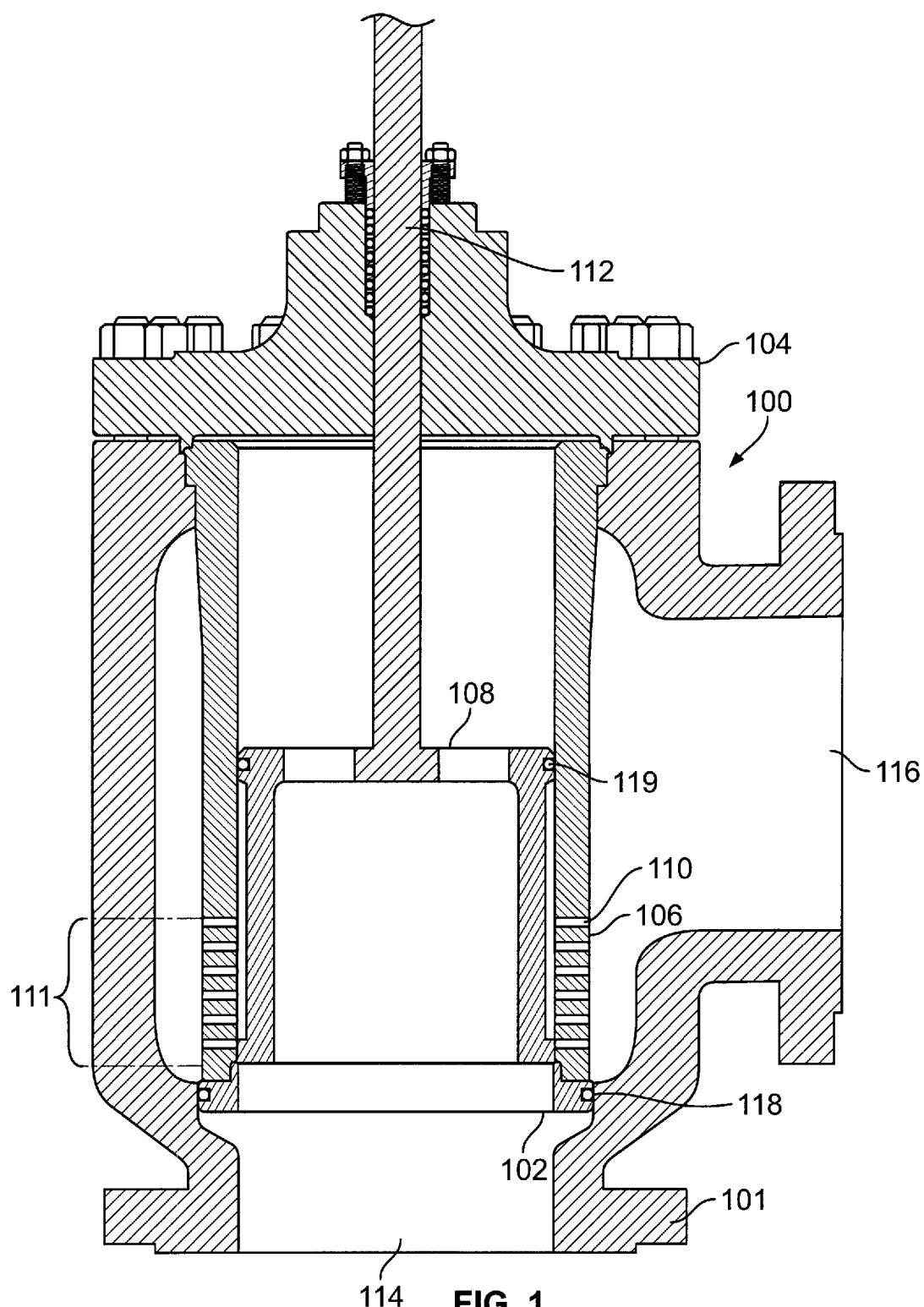
FIG. 1 illustrates a cross-sectional view of a known anti-surge valve.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In general, the example multiple stage anti-surge valves disclosed herein may be used in globe and angle valve bodies in flow-up and flow-down configurations. Specifically, the example multiple stage anti-surge valves described herein provide numerous advantages including, without limitation, fast stroking actuation, noise and vibration attenuation, and variable flow capacity.

The example multiple stage anti-surge valves described herein can allow fluid flow through multiple stages and fluid flow passages in different locations concurrently (e.g., multiple fluid flow paths), thereby significantly shortening the stroke length needed to achieve a given fluid flow. For example, when the plugs of the example valve described herein are spaced from their respective valve seats, fluid flow through first flow passages in a first stage and second fluid flow passages in a second stage are enabled concurrently, thereby decreasing the stroke length needed to achieve a given fluid flow. With a shorter stroke length, the example valves may move or stroke significantly quicker to more effectively counteract a surge condition. Providing the same or greater flow capacity with a significantly shorter stroke length greatly improves surge countermeasures by decreasing the stroke length, decreasing the stroking time, and increasing the stroke frequency (i.e., number of strokes of a valve for a given time).

The example multiple stage anti-surge valves described herein employ a cage having multiple cylindrical sections or regions defined along a longitudinal axis of the cage. Two or more of the sections or regions have fluid flow passages or apertures through the cage to provide multiple controllable, variable fluid flow paths through the cage. The sections having the flow passages or apertures are spaced apart by sections of the cage devoid of fluid flow passages so that each of the sections having flow passages defines a distinct, controllable fluid flow stage. For example, a cage having two cylindrical sections with flow passages spaced apart along the longitudinal axis of the cage by a section devoid of flow passages may be employed to provide a two-stage valve. Additional fluid flow stages beyond two may be provided by adding sections with flow passages along the length of the cage spaced apart by sections devoid of flow passages. Thus, a three-stage valve may include three sections having flow passages, each section with flow passages spaced apart along the longitudinal axis of the cage by a section devoid of flow passages.

In examples described herein, a plug slidably disposed in the cage has a first end adjacent a valve seat that, in operation, moves away from the valve seat to expose one or more flow passages of a first section of the cage to enable fluid flow from an inlet of the valve to an outlet of the valve through the exposed flow passages. The plug also includes at least one aperture through a side or skirt of the plug. The aperture in the skirt of the plug is spaced from the first end of the plug to operatively cooperate with at least one of the sections of the cage. Specifically, in operation, the at least one aperture in the skirt of the plug may be aligned with a section of the cage devoid of flow passages when the plug is engaged with the valve seat, thereby preventing fluid flow from the inlet to the outlet through the skirt of the plug. However, as the valve is stroked and the plug moves away from the valve seat, the at least one aperture in the skirt of the plug aligns with flow passages in a second section of the cage to enable fluid to flow from the inlet to the outlet through the skirt of the plug. In a two-stage valve, the plug may have one or more apertures that only cooperate with the flow passages in the second section of the cage to provide a second flow path through the valve.

Additional fluid flow stages and paths may be realized by adding apertures to the skirt of the plug, where the additional apertures cooperate with flow passages in additional sections of the cage, as noted above. In other words, each fluid flow stage beyond a first stage may be implemented by adding to the cage a section containing flow passages (spaced apart by sections devoid of flow passages) and a corresponding aperture or apertures in the skirt of the plug to cooperate with the corresponding section of the cage to provide an additional controllable, variable fluid flow path through the valve. Thus, in a three-stage valve, the cage may include three sections having flow passages, each spaced apart along the longitudinal axis of the cage by a section devoid of flow passages as noted above, and the plug may include two apertures or two sets of apertures in the skirt of the plug, where each aperture or set of apertures in the plug cooperates with corresponding flow passages in one of the sections of the cage to enable additional controllable, variable fluid flow paths through the valve.

In examples described herein, the manner in which multiple fluid flow stages cooperate to contribute to total fluid flow through the valve can be configured via the spacing between the apertures in the skirt of the plug and the sections of the cage having flow passages relative to the stroke length of the valve. As described in more detail below, the spacings in, for example, a two-stage valve may be selected so that the first stage reaches maximum flow before the second stage begins to contribute to total flow. For example, fluid flow may be enabled through first flow passages before second flow passages (i.e., fluid flow could increase incrementally, exponentially, etc.). Alternatively, the spacings may be selected so that the second stage begins to contribute to total flow before the first stage reaches maximum flow. For example, fluid flow may be enabled through first and second flow passages at the same time (e.g., the apertures in the skirt of the plug may be spaced within one stroke length from the flow passages in the second stage). This may maximize fluid flow over a relatively short stroke length. Still further, the spacings may be selected so that the first and second stages do not contribute to flow at the same time and, thus, alternate in their contribution to total fluid flow.

FIG. 1 illustrates a cross-sectional view of a known anti-surge valve 100. The anti-surge valve 100 of FIG. 1 includes a valve body 101, a valve seat 102, a bonnet 104, and a cage 106 disposed within the valve body 101 between the valve seat 102 and the bonnet 104. A fluid flow control member, such as a plug 108, is slidably disposed within the cage 106 to control fluid flow through fluid flow passages, or apertures 110, extending through a wall of the cage 106. As shown in FIG. 1, the apertures 110 are spaced along the cage 106 over a stroke length 111 from the valve seat 102.

In addition, a valve stem 112 is slidably disposed through the bonnet 104 and attached to an end of the plug 108. The valve stem 112 controls the movement of the plug 108 away from and towards the valve seat 102. The valve stem 112 may be operatively coupled to an actuator (e.g., pneumatic, electric, hydraulic, etc.) that moves the valve stem 112 and the plug 108 between a closed position (e.g., where the plug 108 is sealingly engaged with the valve seat 102) and a fully open position (e.g., where the plug 108 is a stroke length away from the valve seat 102) to allow maximum fluid flow between an inlet 114 and an outlet 116.

In operation, the plug 108 must travel the entire stroke length 111 to maximize flow capacity through the apertures 110. Additionally, to counteract a surge condition, the plug 108 must travel the stroke length 111 very quickly (e.g., a plug may have to travel a 20 inch stroke length in as little as 0.77 seconds). As valves may contain gas, liquids, and slurries at varying temperatures and velocities, a plurality of seal rings 118, 119 may be employed to prevent uncontrolled fluid flow or leakage through the valve 100.

With reference to FIGS. 2A-2B, an example multiple stage anti-surge valve 200 is shown in a closed condition. FIG. 2A illustrates a cross-sectional view of the example multiple stage anti-surge valve 200, while FIG. 2B illustrates an enlarged portion of the example multiple stage anti-surge valve 200.

As shown in FIG. 2A, the example multiple stage anti-surge valve 200 includes a valve body 201, a valve seat 202, a bonnet 204, and a cage 206 clamped in position between the valve seat 202 and the bonnet 204. A fluid flow control member 207 which, in this example, is depicted as a plug, is slidably disposed within the cage 206. The cage 206 is used to guide the plug 207 during a stroke of the valve 200.

In this example, the cage 206 includes first fluid flow apertures or passages 208 disposed within a first section 209 (e.g., a first stage) of the cage 206 adjacent the valve seat 202, second fluid flow apertures or passages 210 disposed in a second section 211 spaced from the first section 209 along a longitudinal axis of the cage 206, and a third section 212 devoid of fluid flow passages between the first section 209 and the second section 211. In this example, the first fluid flow passages 208 are disposed in the first section 209 within one stroke length 213 from the valve seat 202.

The plug 207 controls fluid flow between an inlet 214 and an outlet 216 through the first fluid flow passages 208 and the second fluid flow passages 210. In the illustrated example, the plug 207 controls fluid flow by preventing the flow of fluid between the inlet 214 and the outlet 216 when the plug 207 is sealingly engaged with the valve seat 202 (e.g., a fully closed condition), enabling fluid flow through at least one of the first or second fluid flow passages 208, 210 by moving the plug 207 part of the stroke length 213 (e.g., a partially open position), and enabling fluid flow through all of the fluid flow passages 208, 210 by moving the plug 207 the entire stroke length 213 (e.g., a fully open position).

The plug 207 and the valve seat 202 optionally have at least one seal ring to prevent fluid flow between the components of the multiple stage anti-surge valve 200. In this example, a first seal ring 218 is sealingly disposed between the valve seat 202 and the valve body 201 to prevent uncontrolled fluid flow between the inlet 214 and the outlet 216. More specifically, the first seal ring 218 and the valve seat 202 cause fluid flow to be channeled through the valve seat 202 and into a cavity 220 within the plug 207.

In this example, the plug 207 includes, within a side or skirt 221 of the plug 207, third fluid flow passages 222. In the illustrated example, when the plug 207 is sealingly engaged with the valve seat 202 (e.g., the fully closed condition), the second fluid flow passages 210 and the third fluid flow passages 222 are spaced at most one stroke length from each other. In operation, the third fluid flow passages 222 are to be slidably aligned with the second fluid flow passages 210 during a stroke of the valve 200.

The third fluid flow passages 222 are sized to avoid flow limitation. In the illustrated example, the third fluid flow passages 222 are disposed at a central or middle portion of a body of the plug 207. The middle portion of the plug 207 may be midway between the first section 209 and the second section 211 when the plug 207 is sealed against the valve seat 202. Of course, the third fluid flow passages 222 may be disposed in alternate portions of the plug 207. The third fluid flow passages 222 open into contoured chambers 223 for transitioning flow, as further disclosed herein.

The third fluid flow passages 222 allow the plug 207 to control the flow of fluid through the second fluid flow passages 210, while the space formed between the plug 207 and the valve seat 202 (when the plug 207 is not in the closed condition) allows the plug 207 to control the flow of fluid through the first fluid flow passages 208. For example, when the plug 207 is sealed against the valve seat 202, the third fluid flow passages 222 are aligned with the third section 212 (that is devoid of fluid flow passages) so that fluid flow through all of the fluid flow passages 202, 210, 222 is prevented. The example plug 207 includes a second seal ring 224 disposed between the third fluid flow passages 222 and the first fluid flow passages 208 to prevent uncontrolled fluid flow from the third fluid flow passages 222 through the first fluid flow passages 208 in the first section 209. When the plug 207 is sealed against the valve seat 202, the second seal ring 224 is disposed adjacent a first side of the first fluid flow passages 208 to prevent fluid flow to the first side of the first fluid flow passages 208. When the plug 207 is spaced from the valve seat 202, fluid flow through at least one of the first or second fluid flow passages 208, 210 is enabled.

An actuator (e.g., pneumatic, electric, hydraulic, etc.) may be operatively coupled to the plug 207 via a valve stem 225. The valve stem 225 is slidably disposed through the bonnet 204 and coupled to an end of the plug 207. The valve stem 225 controls the movement of the plug 207 away from and towards the valve seat 202. In numerous examples, the actuator (not shown) moves the valve plug 207 between a fully closed position (e.g., where the valve plug 207 is sealingly engaged with the valve seat 202) and a fully open position (e.g., where the valve plug 207 is a stroke length away from the valve seat 202) to allow fluid flow from the inlet 214 to the outlet 216.

The plug 207 may further include openings 226 disposed adjacent the valve stem 225. The openings 226 allow fluid to flow outside of the plug 207 between the plug 207 and the bonnet 204 within the cage 206. Specifically, a vacuum is prevented by allowing fluid flow between the plug 207 and the bonnet 204 during operation of the valve 200. Further, the plug 207 includes a third seal ring 227 to prevent uncontrolled fluid flow from the area between the plug 207 and the bonnet 204 through the second fluid flow passages 210 in the second section 211. When the plug 207 is sealed against the valve seat 202, the third seal ring 227 is disposed adjacent a first side of the second fluid flow passages 210 to prevent fluid flow to the first side of the second fluid flow passages 210.

In FIG. 2B, an implementation of a first sealing construction to prevent fluid flow from the third fluid flow passages 222 through the apertures 210 in the second section 211 is illustrated. A fourth seal ring 228 is recessed within the skirt 221 of the plug 207 to prevent fluid flow between the third fluid flow passages 222 and the second fluid flow passages 210. Specifically, the fourth seal ring 228 creates a seal between an inner wall 229 of the cage 206 and an outer surface 230 of the plug 207. When the plug 207 is sealed against the valve seat 202, the fourth seal ring 227 is disposed adjacent a second side of the second fluid flow passages 210 to prevent fluid flow to the second side of the second fluid flow passages 210.

In the illustrated example, the fourth seal ring 228 is adjacent a sealing surface 231. The sealing surface 231 is to engage a second valve seat 232 disposed on the inner wall 229 of the cage 206. For example, in the closed condition (e.g., when the plug 207 is sealingly engaged with the valve seat 202), the sealing surface 231 is sealingly engaged with the second valve seat 232 to prevent fluid flow between the third fluid flow passages 222 and the second fluid flow passages 210. In addition, in an open (fully or partially) condition (e.g., when the plug 207 is spaced from the valve seat 202), the sealing surface 231 is disengaged from the second valve seat 232 to allow fluid flow between the third flow passages 222 and the second fluid flow passages 210.

In some examples, the second fluid flow passages 210 interrupt the surface of the inner wall 229, which can scratch or otherwise deform the fourth seal ring 228 if the fourth seal ring 228 is allowed to traverse the surface of the inner wall 229. In the illustrated example, the fourth seal ring 228 is disposed adjacent a contact surface 233 when in the closed condition. The contact surface 233 is displaced from the inner wall 229 of the cage 206 such that the fourth seal ring 228 engages only the contact surface 233 and not the inner wall 229.

The contoured chambers 223 may be defined by the sealing surface 231 and the third section 212. The contoured chambers 223 may have a tapered or funnel-shaped profile in order to effectively transition fluid flow. Specifically, when the sealing surface 231 is engaged with the second valve seat 232, the sealing surface 231 may form an upper wall of the contoured chambers 223. Additionally, the third section 212 may form an outer wall of the contoured chambers 223. The sealing surface 231 and the third section 212 may prevent fluid flow when the plug 207 is in the closed position.

Additionally, the sealing surface 231 may be shaped to transition fluid flow. For example, the sealing surface 231 may have a tapered profile to allow fluid within the contoured chambers 223 or from the third fluid flow passages 222 to traverse the tapered profile such that fluid flow through the second fluid flow passages 210 is not started or stopped abruptly when the sealing surface 231 disengages from or engages with the second valve seat 232.

In some examples, the fourth seal ring 228 is a high-temperature resistant metal seal ring. The fourth seal ring 228 cannot be expanded or compressed as much as non-metal seal rings. For example, the fourth seal ring 228 may have an inner radius that is smaller than the outer radius of the plug 207. In this example, the fourth seal ring 228 cannot be expanded around a plug for installation of the same. Thus, the plug 207 is composed of multiple parts to facilitate installation of the fourth seal ring 228. Specifically, the plug 207 includes a first portion 234 and a second portion 236. The second portion 236 has a first annular protrusion 238 and the first portion 234 has a second annular protrusion 240. The fourth seal ring 228 is installed at a first location 242 adjacent the first annular protrusion 238.

The first portion 234 is mated with the second portion 236 so that the second annular protrusion 240 is disposed at a second location 244 adjacent the first annular protrusion 238. Thus, the first and second annular protrusions 238, 240 are disposed adjacent one another in an interlocking manner. The first portion 234 may be threadably attached to the second portion 236 at a location 245. Alternately, the first portion 234 may be attached to the second portion 236 using, for example, TIG welding, TAG welding, glue, screws, bolts, rivets, interlocking of the first and second annular protrusions 238, 240 or other known securing means. The first and second portions 234, 236 of the plug 207 form a cavity or recess 246 to capture the fourth seal ring 228. Additionally, the clearance between the inner wall 229 of the cage 206 and the outer surface 230 of the plug 207 may be selected to reduce mechanical noise.

The example multiple stage anti-surge valve 200 is shown as symmetrical in cross section, because the components of the multiple stage anti-surge valve 200 including, without limitation, the valve seat 202, the cage 206, the plug 207, etc. may be cylindrical. For example, while the third fluid flow passages 222 are shown on a left and right side of the plug 207 in the example cross-sectional view of FIG. 2A, the third fluid flow passages 222 may be circumferentially disposed around a cylindrical plug. Of course, other known shapes or geometries instead of cylindrical shapes may be used without departing from the scope of the present disclosure.

Figure 4:
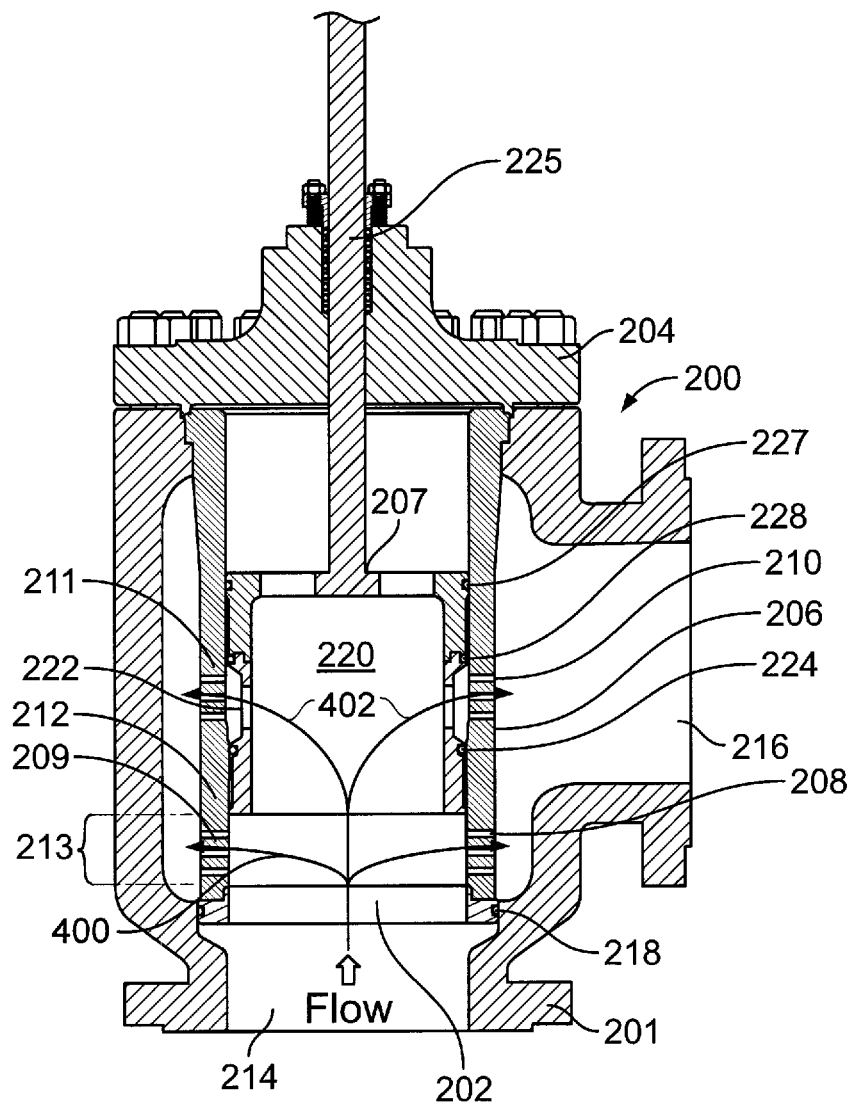
FIG. 4 illustrates a cross-sectional view of the example multiple stage anti-surge valve of FIG. 2A in a fully open condition.

When the example plug 207 is sealingly engaged with the valve seat 202, fluid flows from the inlet 214 into the cavity 220. In some examples, fluid flows out the third fluid flow passages 222 into the contoured chambers 223, but the walls of the cage 206 (e.g., the third section 212) prevent further flow. Additionally, the second seal ring 224, the sealing surface 231 and valve seat 232, and the fourth seal ring 228 further prevent fluid flow. When the example plug 207 is spaced a stroke length 213 away from the valve seat 202 (as shown in FIG. 4), fluid flow is enabled through at least one of the third fluid flow passages 222 via the cavity 220, the first fluid flow passages 208 in the first section 209, and/or the second fluid flow passages 210 in the second section 211 via the cavity 220.

As can be seen in the example of FIG. 2A, configuring the cage 206 to have multiple spaced-apart sections (e.g., sections 209, 211), each of which comprises apertures or flow passages, enables a greater number of apertures and, thus, a greater total cross-sectional flow passage area to be opened or exposed to the fluid flow path for a given stroke length of the valve plug 207. As a result, the example valve 200 of FIG. 2A can achieve a relatively high flow rate over a relatively short stoke length and, as such, can do so relatively quickly in comparison to known valves such as the valve 100 of FIG. 1.

With reference to FIGS. 3A-3B, the example multiple stage anti-surge valve 200 is shown in an intermediate or partially open position. FIG. 3A illustrates a cross-sectional view of the example multiple stage anti-surge valve 200, while FIG. 3B illustrates an enlarged portion of the example multiple stage anti-surge valve 200.

As shown in FIG. 3A, the plug 207 is displaced away from the valve seat 202 in a mid-stroke position. In this intermediate position, the plug 207 is displaced enough to expose the first fluid flow passages 208 to fluid in the inlet 214. Specifically, fluid flows from the inlet 214, through the valve seat 202, through at least one of the first fluid flow passages 208 in the first section 209, to the outlet 216. Additionally, fluid flows through the third fluid flow passages 222, through at least one of the second fluid flow passages 210 in the second section 211 (as shown in more detail in FIG. 3B), to the outlet 216.

As shown in FIG. 3B, the sealing surface 231 is angled or tapered to transition fluid flow from the third fluid flow passages 222 to a first aperture 210a (e.g., a first one of the second fluid flow passages 210). For example, the sealing surface 231 may allow fluid within the contoured chambers 223 or from the third fluid flow passages 222 to traverse the angled or tapered sealing surface 231 such that fluid flow through the second fluid flow passages 210 is not started or stopped abruptly when the sealing surface 231 disengages from or engages with the second valve seat 232. Alternatively in flow-down configurations, the sealing surface 231 may allow fluid from the outlet 216 to traverse the angled or tapered sealing surface 231 such that fluid flow through the second fluid flow passages 210 is not started or stopped abruptly when the sealing surface 231 disengages from or engages with the second valve seat 232

In the illustrated example, the outer wall 230 of the plug 207 is spaced a distance 300 away from the inner wall 229 of the cage 206 in the intermediate position. In some examples, the plug 207 is spaced the distance 300 away from the inner wall 229 such that the fourth seal ring 228 is displaced from the second fluid flow passages 210 in the inner wall 229 to avoid deformation of the same. Accordingly, fluid may flow through a second aperture 210b (e.g., a second one of the second fluid flow passages 210). In some examples, fluid may flow through the second aperture 210b at a different pressure, velocity, and/or temperature than the first aperture 210a.

The first and second fluid flow passages 208, 210 may be designed to reduce noise and/or vibrations. Accordingly, noise and/or vibration reduction techniques may be applied in determining the size, position, and flow trajectory therethrough. The first and second fluid flow passages 208, 210 may be slits, openings, holes, etc., drilled or otherwise formed to penetrate the walls of the cage 206; channels designed to increase and/or decrease flow velocity; funnels, cones, and/or other noise and vibration reducing designs. Additionally, the first and second fluid flow passages 208, 210 may be substantially straight, curved, arcuate, angled, tapered, and/or any other shape or profile. For example, the first and second fluid flow passages 208, 210 may provide a plurality of flow passages that may jet or spray a fluid. As such, fluid flowing between the inlet 214 and the outlet 216 may be sprayed to reduce energy in a flow stream (excess energy could otherwise be converted to noise), and/or shift the frequency of any generated noise to frequencies outside an audible range.

In alternate examples, the third fluid flow passages 222 may also be designed to reduce noise and/or vibrations. In these alternate examples, the noise and/or vibration attenuation may occur in all of the fluid flow passages 208, 210, 222. For example, there may be a first noise and vibration attenuation through the third fluid flow passages 222 and a second noise and vibration attenuation through the first and second fluid flow passages 208, 210. In another example, there may be noise attenuation through the third fluid flow passages 222 and vibration attenuation through the first and second fluid flow passages 208, 210. In even further examples, there may be noise attenuation through the first fluid flow passages 208 in a first stage (e.g., the first section 209) and vibration attenuation through the second fluid flow passages 210 in a second stage (e.g., the second section 211). Of course, these techniques and/or other example noise and/or vibration attenuation methods may be used, combined, and/or aligned serially and/or in parallel without departing from the scope of the present disclosure.

With reference to FIG. 4, the example multiple stage anti-surge valve 200 is shown in a fully open position or condition. The plug 207 is shown displaced the full stroke length 213 away from the valve seat 202. In the fully open position, the plug 207 is displaced to expose to the inlet 214 all of the first fluid flow passages 208 in the first section 209 and all of the second fluid flow passages 210 in the second section 211. Specifically, a first flow path 400 and a second flow path 402 may be formed. The first flow path 400 is where fluid flows from the inlet 214, through the valve seat 202, through the first fluid flow passages 208, to the outlet 216. Further, the second flow path 402 is where fluid flows from the inlet 214, through the valve seat 202, through the third fluid flow passages 222, through the second fluid flow passages 210, to the outlet 216. Of course, the flow paths 400, 402 may be reversed in flow-down configurations.

As the plug 207 transitions between positions, fluid pressure, velocity, and/or temperature may fluctuate. Additionally, the pressure, velocity, and/or temperature of fluid flowing through flow passages 210 may differ from the pressure, velocity, and/or temperature of fluid through flow passages 208. However, flow capacity is maximized when all fluid flow passages 208, 210 are exposed and fluid flow therethrough is enabled. In accordance with the present disclosure, flow capacity greater than or equal to the known anti-surge control valve shown in FIG. 1 is achieved with a significantly shorter travel or stroke (e.g., the stroke length 213 in FIG. 2 is significantly less than the stroke length 111 in FIG. 1) and therefore, maximum flow capacity can be achieved more quickly than the known valve 100 of FIG. 1.

Figure 5A:
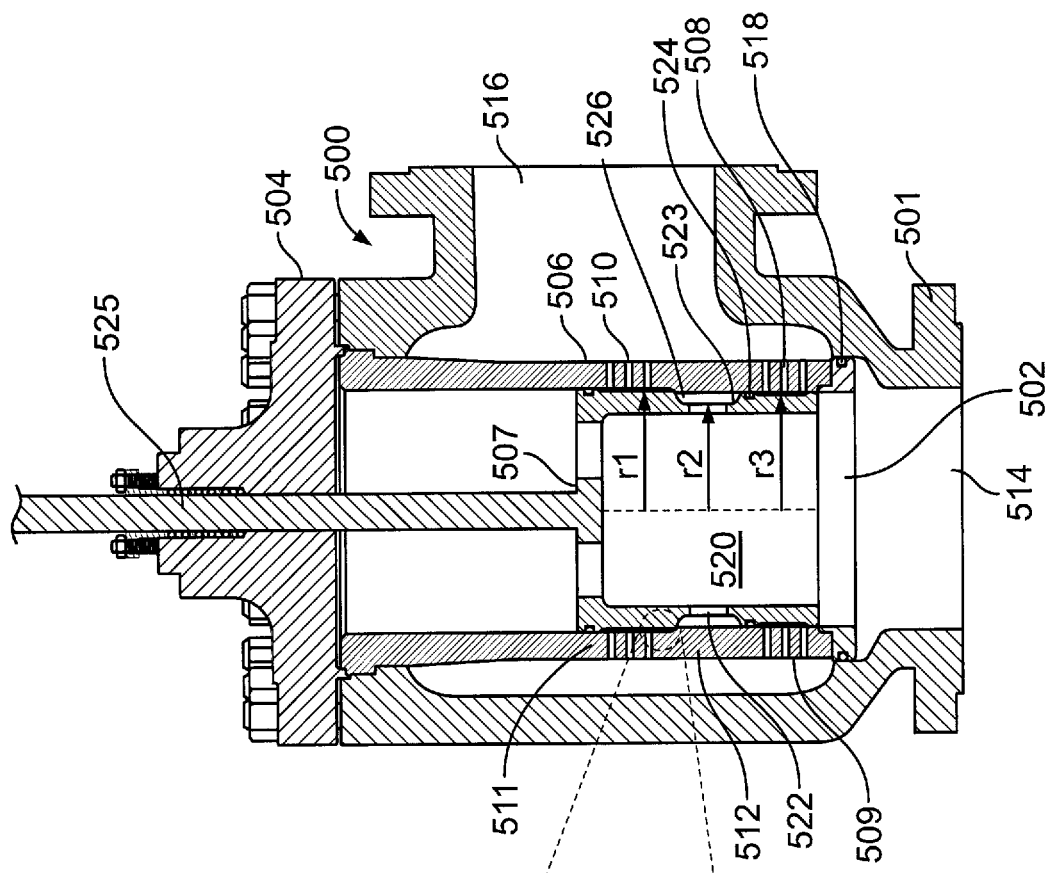
FIG. 5A illustrates a cross-sectional view of another example multiple stage anti-surge valve.
Figure 5B:
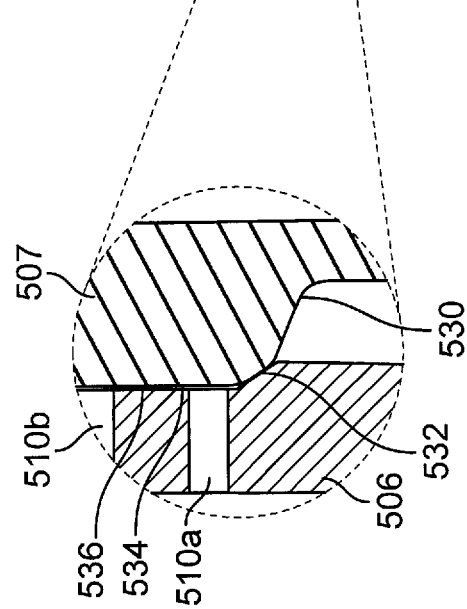
FIG. 5B illustrates an enlarged portion of the multiple stage anti-surge valve illustrated in FIG. 5A.

An alternate example multiple stage anti-surge valve 500 is shown in FIGS. 5A-5B. In FIG. 5A, the example multiple stage anti-surge valve 500 includes a valve body 501, a valve seat 502, a bonnet 504, a cage 506 disposed within the valve body 501 between the valve seat 502 and the bonnet 504, and a fluid flow control member, depicted as a plug 507 in FIG. 5A, slidably disposable within the cage 506. The cage 506 may be used to guide the plug 507 during a stroke of the valve 500.

In the illustrated example, the plug 507 is to control fluid flow through first fluid flow passages 508 in a first section 509 of the cage 506 and second fluid flow passages 510 in a second section 511 of the cage 506. In addition, the cage 506 includes a third section 512 devoid of fluid flow passages disposed between the first section 509 and the second section 511. Specifically, the plug 507 controls fluid flow between an inlet 514 and an outlet 516 through the first and second fluid flow passages 508, 510 (e.g., enabled when the plug 507 is in an open condition, disabled when the plug 507 is in a fully closed condition). In the illustrated example, the valve seat 502 includes a first seal ring 518 disposed between the valve seat 502 and the valve body 501. The first seal ring 518 prevents uncontrollable fluid flow between the inlet 514 and the outlet 516 and forces fluid to enter a cavity 520 within the plug 507. From within the cavity 520 in the plug 507, fluid may flow through third fluid flow passages 522 disposed within a skirt or wall 523 of the plug 507. In the fully closed condition, further fluid flow may be prevented by the third section 512 (which is devoid of fluid flow passages). Additionally, the plug 507 may include a second seal ring 524 disposed between the third fluid flow passages 522 and the first fluid flow passages 508 and between the plug 507 and cage 506 to prevent fluid flow from the third fluid flow passages 522 and the first fluid flow passages 508 when the plug 507 is in the fully closed condition.

The plug 507 may be moved from the fully closed condition to a fully open condition via a valve stem 525. In the illustrated example, the plug 507 controls fluid flow by preventing the flow of fluid between the inlet 514 and the outlet 516 when the plug 507 is sealingly engaged with the valve seat 502 (e.g., in the fully closed condition), enabling fluid flow through at least one of the first or second fluid flow passages 508, 510 by moving the plug 507 part of a stroke length (e.g., in a partially open condition), and enabling fluid flow through all of the fluid flow passages 508, 510, 522 by moving the plug 507 the entire stroke length (e.g., in the fully open condition).

Additionally shown in FIG. 5A, the plug 507 may have a first outer radius r1 (and a corresponding first outer diameter), a second outer radius r2 (and a corresponding second outer diameter), and a third outer radius r3 (and a corresponding third outer diameter). In the illustrated example, the second outer radius r2 is smaller than the third outer radius r3, and the third outer radius r3 is smaller than the first outer radius r1 (e.g., r2<r3<r1). As disclosed below, the largest outer diameter (e.g., the first outer diameter) acts as a secondary plug, sealingly engaging the inner walls of the cage 506. Because of the differing radii, contoured chambers 526 may be formed to provide a transition for fluid that may flow through the third fluid flow passages 522 and the second fluid flow passages 510.

FIG. 5B illustrates an enlarged portion of the alternate example multiple stage anti-surge valve 500 illustrated in FIG. 5A. In FIG. 5B, an implementation of a second sealing construction to control fluid flow from the third fluid flow passages 522 to the second fluid flow passages 510 is illustrated. Specifically, the plug 507 includes a transition portion which, in the illustrated example, is depicted as a sealing surface 530. As shown, the sealing surface 530 is angled or tapered to transition fluid flow from the third fluid flow passages 522 to a first aperture 510a (e.g., a first one of the second fluid flow passages 510). The cage 506 includes a corresponding second valve seat 532 disposed within an inner wall of the cage 506. In the closed condition (e.g., when the plug 507 is sealingly engaged with the valve seat 502), the sealing surface 530 is also sealingly engaged with the second valve seat 532 to prevent fluid flow between the third fluid flow passages 522 and the first aperture 510a.

In the illustrated example, the sealing surface 530 may form one of the walls of the contoured chambers 526. For example, the sealing surface 530 may allow fluid within the contoured chambers 526 or from the third fluid flow passages 522 to traverse the angled or tapered sealing surface 530 such that fluid flow through the second fluid flow passages 510 is not started or stopped abruptly when the sealing surface 530 disengages from or engages with the second valve seat 532. As further shown in FIG. 5B, the outer wall 534 of the plug 507 is not spaced from the inner wall 536 of the cage 506 as in the example valve 200. Accordingly, this may prevent fluid flow through a second aperture 510b (e.g., a second one of the second fluid flow passages 510), even where fluid flow through the first aperture 510a is enabled.

In the illustrated example, the plug 507 does not include a seal ring adjacent the sealing surface 530, as in previous examples. This example plug 507 provides a reduced friction design (e.g., a seal ring can cause friction against the cage when the plug is in motion), saves manufacturing costs (e.g., the plug does not need to be composed of multiple pieces to install the seal ring), and saves component costs (e.g., a seal ring need not be purchased and/or used). Because the illustrated example does not include a seal ring adjacent the sealing surface 530, the outer wall 534 of the plug 507 may traverse the inner wall 536 of the cage 506 without scratching or otherwise deforming a seal ring. However, the clearance between the cage 506 and the plug 507 may be designed to reduce mechanical noise.

While the example multiple stage anti-surge valve 500 includes a different sealing construction than that of the example multiple stage anti-surge valve 200, the fluid flow characteristics may be similar to the characteristics previously described. This may also be the case with an example multiple stage anti-surge valve 600 shown and described with reference to FIGS. 6A-6B.

FIG. 6A illustrates a cross-sectional view of an alternate example multiple stage anti-surge valve 600. In FIG. 6A, the example multiple stage anti-surge valve 600 includes a valve body 601, a valve seat 602, a bonnet 604, a cage 606 disposed within the valve body 601 between the valve seat 602 and the bonnet 604, and a fluid flow control member, depicted as a plug 607, slidably disposable within the cage 606. The cage 606 is used to guide the plug 607 during a stroke of the valve 600.

In the illustrated example, the plug 607 is to control fluid flow through first fluid flow passages 608 in a first section 609 of the cage 606 and second fluid flow passages 610 in a second section 611 of the cage 606. In addition, the cage 606 includes a third section 612 devoid of fluid flow passages disposed between the first section 609 and the second section 611. Specifically, the plug 607 controls fluid flow between an inlet 614 and an outlet 616 through the first and second fluid flow passages 608, 610 (e.g., enabled when the plug 607 is in an open position, disabled when the plug 607 is in a closed position). In the illustrated example, the valve seat 602 includes a first seal ring 618 disposed between the valve seat 602 and the valve body 601. The first seal ring 618 prevents uncontrollable fluid flow between the inlet 614 and the outlet 616 and forces fluid to enter a cavity 620 within the plug 607. From within the cavity 620 in the plug 607, fluid may flow through third fluid flow passages 622 disposed within a skirt or wall 623 of the plug 607. In the closed condition, further fluid flow may be prevented by the third section 612 (which is devoid of fluid flow passages). Additionally, the plug 607 may include a second seal ring 624 disposed between the third fluid flow passages 622 and the first fluid flow passages 608 and between the plug 607 and cage 606 to prevent fluid flow from the third fluid flow passages 622 and the first fluid flow passages 608 when the plug 607 is in the closed condition.

The plug 607 may be moved from the closed condition to a fully open condition via a valve stem 625. The plug 607 controls fluid flow by preventing the flow of fluid from the inlet 614 when the plug 607 is sealingly engaged with the valve seat 602 (e.g., in the closed condition), enabling fluid flow through at least one of the first or second fluid flow passages 608, 610 by moving the plug 607 part of a stroke length (e.g., in a partially open condition), and enabling fluid flow through all of the fluid flow passages 608, 610, 622 by moving the plug 607 the entire stroke length (e.g., in the fully open condition).

In the illustrated example, the third section 612 and the third fluid flow passages 622 disposed within the skirt or wall 623 of the plug 607 form contoured chambers 626, where fluid may be temporarily contained when the plug 607 is in the closed position. A transition portion 627 may form one of the walls of the contoured chambers 626. For example, the transition portion 627 may allow fluid within the contoured chambers 626 or from the third fluid flow passages 622 to traverse the tapered or angled transition portion 627 such that fluid flow through the second fluid flow passages 610 is not started or stopped abruptly when the contoured chambers 626 expose the third fluid flow passages 622 to the second fluid flow passages 610.

FIG. 6B illustrates an enlarged portion of the alternate example multiple stage anti-surge valve illustrated in FIG. 6A. In FIG. 6B, a third sealing construction is to control fluid flow from the third fluid flow passages 622 through the second fluid flow passages 610. As shown, the cage 606 includes a seal ring 628 recessed within an inner wall 629 of the cage 606 adjacent a sealing surface 630 and a second valve seat 632. The sealing surface 630 may be disposed on an outer surface 631 of the plug 607 and the second valve seat 632 may be disposed on the inner wall 629 of the cage 606. In the fully closed condition (e.g., when the plug 607 is sealingly engaged with the valve seat 602), the sealing surface 630 is sealingly engaged with the second valve seat 632 to prevent fluid flow between the third fluid flow passages 622 and the second fluid flow passages 610.

The seal ring 628 is to prevent fluid flow between the third fluid flow passages 622 and the second fluid flow passages 610. Specifically, the seal ring 628 creates a seal between the inner wall 629 of the cage 606 and the outer surface 631 of the plug 607. In some examples, the seal ring 628 is a high-temperature resistant metal seal ring. In these examples, the seal ring 628 cannot be expanded or be compressed as much as non-metal seal rings. The seal ring 628 may have an outer radius that is larger than the inner radius of the cage 606 such that the seal ring 628 cannot be compressed within the cage 606 for installation of the same.

In these examples, the cage 606 is composed of multiple parts to facilitate installation of the seal ring 628. Specifically, the cage 606 includes a first portion 634 and a second portion 636. The second portion 636 has a first annular protrusion 638 and the first portion 634 has a second annular protrusion 640. The seal ring 628 is installed at a first location 642 adjacent the first annular protrusion 638. The first portion 634 is mated with the second portion 636 so that the second annular protrusion 640 is disposed at a second location 644 adjacent the first annular protrusion 638. Thus, the first and second annular protrusions 638, 640 may be disposed adjacent one another in an interlocking manner. The first portion 634 may be threadably attached to the second portion 636 at a location 645. Alternatively, the first portion 634 may be attached to the second portion 636 using, for example, TIG welding, TAG welding, glue, screws, bolts, rivets, interlocking of the first and second annular protrusions or other known securing means. The first and second portions 634, 636 of the cage 606 form a cavity or recess 646 to capture the seal ring 628.

In some examples, the fluid flow passages may be staggered such that first fluid flow passages may be exposed without exposing second fluid flow passages. For example, a valve may be designed to allow exposure of the first fluid flow passages when the second fluid flow passages are not exposed and to allow exposure of second fluid flow passages when first fluid flow passages are not exposed such that fluid flow may alternate between fluid flow passages. Alternatively, second fluid flow passages may be exposed subsequently to exposure of the first fluid flow passages. Another example includes a valve designed to allow a first passage for a first set of fluid flow passages to be exposed (e.g., 1 passage), a second passage from a second set of fluid flow passages and the first passage to be exposed (e.g., 2 passages), a third passage from the first set of fluid flow passages and the first and second passages to be exposed (e.g., 3 passages), etc., thereby increasing fluid flow incrementally. In yet another example, fluid flow passages may be exposed exponentially (e.g., 1, 2, 4, 8, 16, etc.). These examples all provide flow volume equal to or greater than the flow volume of the known valve 100 of FIG. 1 with a stroke length significantly shorter that the stroke length of the known valve 100 of FIG. 1.

Furthermore, the fluid flow passages 208, 210, 508, 510, 608, 610 may be formed in many different ways, including without limitation, drilled, cast as windows, slits, channeled to increase and/or decrease flow velocity, funneled, conical, and/or other geometries or shapes. For example, the first fluid flow passages 208, 508, 608 may be drilled hole flow paths while the second fluid flow passages 210, 510, 610 may be cast window flow paths. Thus, the fluid flow passages 208, 210, 508, 510, 608, 610 may have similar flow paths or different flow paths, to suit the needs of a particular application. While the previous examples illustrate first sections 209, 509, 609, second sections 211, 511, 611, and third sections 212, 512, 612, any number of sections or stages may be used without departing from the scope of the present disclosure.

Figure 7:
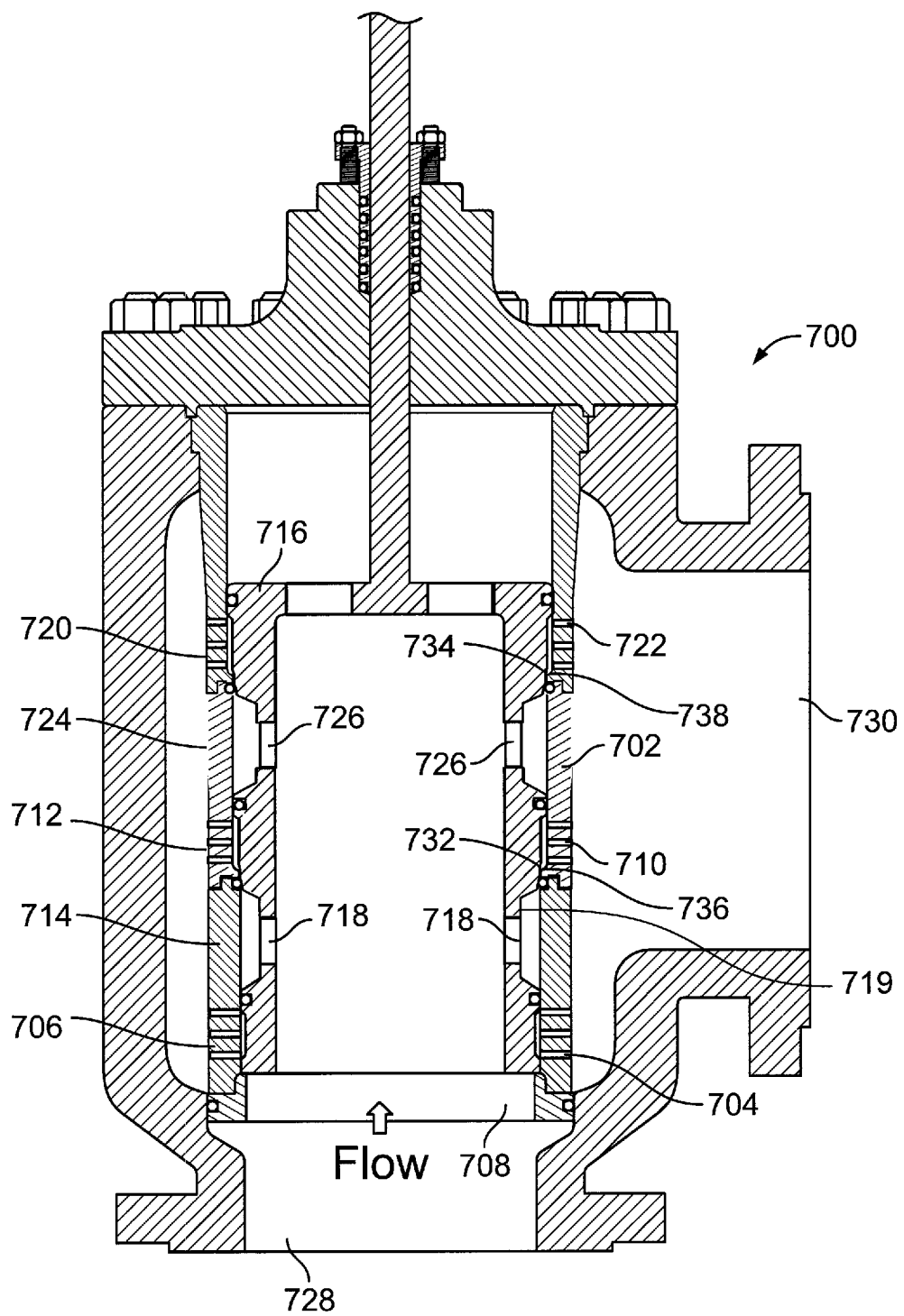
FIG. 7 illustrates a cross-sectional view of yet another example multiple stage anti-surge valve.

As shown in FIG. 7, another multiple stage anti-surge valve 700 has a cage 702 including first fluid flow passages 704 within a first section 706 adjacent a valve seat 708, second fluid flow passages 710 within a second section 712 spaced from the first section 706 along a longitudinal axis of the cage 702, and a third section 714 devoid of a fluid flow passage between the first and second sections 706, 712. The multiple stage anti-surge valve 700 may further have a plug 716 slidably disposed within the cage 702. The cage 702 may be used to guide the plug 716 during a stroke of the valve 700. The plug 716 may have third fluid flow passages 718 disposed within a skirt 719 of the plug 716. The third fluid flow passages 718 slidably align with the second fluid flow passages 710 during a stroke of the valve 700.

The cage 702 may additionally have a fourth section 720 spaced from the second section 712 along the longitudinal axis of the cage 702. The fourth 720 section may have fourth fluid flow passages 722. The cage 702 may also have a fifth section 724 devoid of fluid flow passages between the second and fourth sections 712, 720. In this example, the plug 716 additionally includes fifth fluid flow passages 726 through the skirt 719 of the plug 716 longitudinally spaced from the third fluid flow passages 718. The fifth fluid flow passages 726 slidably align with the fourth fluid flow passages 722 during a stroke of the valve 700.

In some examples, when the plug 716 is sealed against the valve seat 708 (e.g., a closed condition), the third fluid flow passages 718 are aligned with the third section 714 of the cage 702 and the fifth fluid flow passages 726 are aligned with the fifth section 724 of the cage 702 so that fluid flow through the fluid flow passages is prevented. In other examples, when the plug 716 is spaced from the valve seat 708 (e.g., a fully open condition), fluid flow through at least one of the first, second, or fourth fluid flow passages 704, 710, 722 is enabled. Specifically, fluid may flow between an inlet 728 and an outlet 730 through the valve seat 708, the first fluid flow passages 704 in the first section 706, the third fluid flow passages 718 and the second fluid flow passages 710, and through the fifth fluid flow passages 726 and the fourth fluid flow passages 722.

In addition to the valve seat 708, the plug 716 may have a first sealing surface 732 adjacent the third fluid flow passages 718. The plug 716 may further have a second sealing surface 734 adjacent the fifth fluid flow passages 726. Further, the cage 702 may have a second valve seat 736 disposed in the second section 712 so that the first sealing surface 732 may engage when the plug 716 is in the closed condition. Even further, the cage 702 may have a third valve seat 738 disposed in the fourth section 720 that the second sealing surface 734 may engage when the plug 716 is in the closed condition. As discussed herein, the sealing surfaces 732, 734 and the valve seats 736, 738 can be arranged as set forth in FIG. 2B, FIG. 5B, FIG. 6B and/or alternate sealing configurations. Accordingly, seal rings may also be included as discussed in connection with FIGS. 2B, 5B, and 6B.

In the illustrated example, when the multiple stage anti-surge valve 700 is in the closed position, the first sealing surface 732 may engage the second valve seat 736 to prevent fluid flow from the third fluid flow passages 718 through the second fluid flow passages 710. Also, the second sealing surface 734 may engage the third valve seat 738 to prevent fluid flow from the fifth fluid flow passages 726 through the fourth fluid flow passages 722.

In the illustrated example, when the multiple stage anti-surge valve 700 is in the fully open position, the plug 716 and, thus, the sealing surfaces 732, 734, are displaced enough to allow fluid flow through the fluid flow passages 704, 710, 718, 722, 726. As the plug 716 transitions between the fully open and closed positions, fluid pressure, velocity, and/or temperature may fluctuate. However, flow capacity may be maximized when all of the fluid flow passages 704, 710, 718, 722, 726 are exposed and fluid flow therethrough is enabled. In some examples, flow capacity greater than the anti-surge control valve 100 shown in FIG. 1 is achieved with a significantly shorter travel and, therefore, a faster stroke of the valve 700.

Components and/or sections of all the example valves disclosed herein may be combined, interchanged, used together or separately, and/or removed without departing from the scope of the present disclosure. From the foregoing, it will be appreciated that the above disclosed apparatus and articles of manufacture provide valves having multiple stages and multiple flow paths that allow for fast stroking, noise and/or vibration attenuation, and/or variable flow capacity, as disclosed herein. Although certain example apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:

1. An apparatus, comprising:
    a valve cage disposed between a bonnet and a valve seat, the valve cage having a first section adjacent the valve seat and having a first set of fluid flow passages, a second section spaced from the first section along a longitudinal axis of the valve cage and having a second set of fluid flow passages, and a third section devoid of a fluid flow passage between the first and second sections, the first set of fluid flow passages including a first fluid flow passage, the second set of fluid flow passages including a second fluid flow passage, the third section spanning, in a direction along the longitudinal axis, a distance greater than a combined width of at least two adjacent ones of the fluid flow passages and a spacing between the at least two adjacent ones of the fluid flow passages, the two fluid flow passages associated with either of the first or second set of fluid flow passages;

a plug slidably disposed in the valve cage, the plug having a third fluid flow passage through a skirt of the plug, the third fluid flow passage to be fluidly coupled to the second fluid flow passage during a stroke of the plug; and a seal ring disposed between the valve cage and the plug.

2. The apparatus as defined in claim 1, wherein when the plug is sealed against the valve seat, the third fluid flow passage is aligned with the third section of the valve cage so that fluid flow through the first and second sets of fluid flow passages is prevented and, when the plug is spaced from the valve seat, fluid flow through at least one of the first or second sets of fluid flow passages is enabled.

3. The apparatus as defined in claim 1, wherein when the plug is spaced from the valve seat, fluid flow through the first, second and third fluid flow passages is enabled.

4. The apparatus as defined in claim 1, wherein the seal ring is disposed on an outside surface of the plug, wherein when the plug is sealed against the valve seat, the seal ring is disposed adjacent a first side of the first fluid flow passage to prevent fluid flow to the first side of the first fluid flow passage.

5. The apparatus as defined in claim 1, wherein the seal ring is a first seal ring disposed on an outside surface of the plug, wherein when the plug is sealed against the valve seat, the first seal ring is disposed adjacent a first side of the second fluid flow passage to prevent fluid flow to the first side of the second fluid flow passage.

6. The apparatus as defined in claim 5, further including a second seal ring in contact with the outside surface of the plug, wherein when the plug is sealed against the valve seat, the second seal ring is disposed adjacent a second side of the second fluid flow passage to prevent fluid flow to the second side of the second fluid flow passage.

7. The apparatus as defined in claim 6, wherein the second seal ring is recessed within the outside surface of the plug.

8. The apparatus as defined in claim 5, further including a second seal ring in contact with an inside surface of the valve cage adjacent a second side of the second fluid flow passage to prevent fluid flow to the second side of the second fluid flow passage when the plug is sealed against the valve seat.

9. The apparatus as defined in claim 8, wherein the second seal ring is recessed within the inside surface of the valve cage.

10. The apparatus as defined in claim 1, wherein the valve cage further includes a fourth section spaced from the second section along the longitudinal axis of the valve cage and having a fourth fluid flow passage, and a fifth section devoid of a fluid flow passage between the second and fourth sections, and the plug further includes a fifth fluid flow passage through the skirt of the plug, wherein when the plug is sealed against the valve seat, the fifth fluid flow passage is aligned with the fifth section of the valve cage so that fluid flow through the fluid flow passages is prevented and when the plug is spaced from the valve seat, fluid flow through at least one of the first, second, or fourth fluid flow passages is enabled.

11. The apparatus of claim 1, wherein the third fluid flow passage opens into a contoured chamber defined between an outer wall of the plug and an inner wall of the valve cage, the contoured chamber having a first dimension along the inner wall of the valve cage in a direction along the longitudinal axis that is smaller than the third section measured in the direction along the longitudinal axis.

12. The apparatus of claim 1, wherein the valve seat is a first valve seat, the valve cage having a second valve seat disposed on an inner wall of the cage, the plug having a sealing surface disposed on an outer wall of the plug, the sealing surface to sealingly engage with the second valve seat.

13. An apparatus, comprising:
a valve seat coupled to a cage, the cage having first and second apertures disposed in a side of the cage within one stroke length from the valve seat, and third and fourth apertures disposed in the side of the cage more than one stroke length from the valve seat, the second aperture between the first aperture and the third aperture, the third aperture between the second aperture and the fourth aperture, the second aperture spaced from the first aperture along a longitudinal axis of the cage by a first distance, the third aperture spaced from the second aperture along the longitudinal axis by a second distance greater than the first distance, the cage being devoid of an aperture positioned between the second and third apertures;

a fluid flow control member to be slidably disposed within the cage, the fluid flow control member including a fifth aperture disposed in a side of the fluid flow control member; and a seal ring disposed on an outside surface of the fluid flow control member.

14. The apparatus as defined in claim 13, wherein the fifth aperture is to be slidably aligned with at least one of the third or fourth apertures during a stroke of the fluid flow control member.

15. The apparatus as defined in claim 13, wherein fluid flow through the first, second, third, and fourth apertures in the cage is prevented when the fluid flow control member is in contact with the valve seat.

16. The apparatus as defined in claim 13, wherein when the fluid flow control member is displaced one stroke length from the valve seat, fluid flow through at least one of the first, second, third, or fourth apertures is enabled.

17. The apparatus as defined in claim 13, wherein when the fluid flow control member is displaced one stroke length from the valve seat, fluid flow through the first aperture, the second aperture, the third aperture, the fourth aperture, and the fifth aperture is enabled.

18. The apparatus as defined in claim 13, wherein the valve seat is a first valve seat, the apparatus further comprising:
a second valve seat disposed on an inside surface of the cage adjacent the third aperture; and
wherein fluid flow through the third and fourth apertures in the cage is prevented when the fluid flow control member is in contact with the second valve seat.

19. The apparatus as defined in claim 13, wherein the fluid flow control member has a first diameter, a second diameter, and a first transition portion from the first diameter to the second diameter, the second diameter smaller than the first diameter.

20. An apparatus, comprising:
- means for controlling fluid flow within a valve, the means for controlling fluid flow comprising first means for allowing fluid flow therethrough, the valve including a bonnet and a valve seat;
- means for guiding the means for controlling fluid flow during a stroke of the valve, the means for guiding comprising second, third, fourth, and fifth means for allowing fluid flow therethrough, the third means between the second means and the fourth means, the fourth means between the third means and the fifth means, the third and fourth means spaced farther apart than the second and third means along a longitudinal axis of the means for guiding, the means for guiding devoid of a means for allowing fluid flow between the third and fourth means, the means for guiding the means for controlling fluid flow disposed between the bonnet and the valve seat; and
- means for preventing fluid flow through at least one of the second, third, fourth, or fifth means for allowing fluid flow therethrough when the means for controlling fluid flow is in a closed condition.

21. The apparatus as defined in claim 20, wherein during the stroke of the valve, the first means for allowing fluid flow therethrough aligns with at least one of the fourth or fifth means for allowing fluid flow therethrough to enable fluid flow through both the first means for allowing fluid flow therethrough and the at least one of the fourth or fifth means for allowing fluid flow therethrough.

\* \* \* \* \*